United States Patent

[11] 3,537,589

| [72] | Inventors | Anthony J. Fratto;<br>Richard D. James; James D. Helm, Moab, Utah |
|---|---|---|
| [21] | Appl. No. | 782,242 |
| [22] | Filed | Dec. 9, 1968 |
| [45] | Patented | Nov. 3, 1970 |
| [73] | Assignee | Texas Gulf Sulphur Company Inc.<br>New York, New York<br>a corporation of Texas |

[54] OUTSIDE DRIVE FOR A TILTING PAN FILTER
6 Claims, 3 Drawing Figs.

[52] U.S. Cl........................................... 210/328,
210/541
[51] Int. Cl.......................................... B01d 35/08
[50] Field of Search............................ 210/(H.F.
Digest), 324, 328, 330, 329, 541, 542, 251, 359,
385, 396

[56] References Cited
UNITED STATES PATENTS

| 2,553,387 | 5/1951 | Slama........................... | 210/396X |
| 2,716,494 | 8/1955 | Hursh........................... | 210/396 |

Primary Examiner—Reuben Friedman
Assistant Examiner—Frank A. Spear, Jr.
Attorney—Kenyon and Kenyon Reilly Carr and Chapin ABSTRACT: The required rotary motion is imparted to the tilting pan filter by use of a drive chain around the perimeter of the rotating parts. The drive chain engages a toothed gear welded to the undercarriage of the rotating part as well as a sprocket on the output shaft of the gear motor mounted outside the outer diameter of the tilting pan filter. Additionally, centering wheels and sprockets are used to make adjustments in the drive to compensate for wear and chain stretch.

Patented Nov. 3, 1970
3,537,589
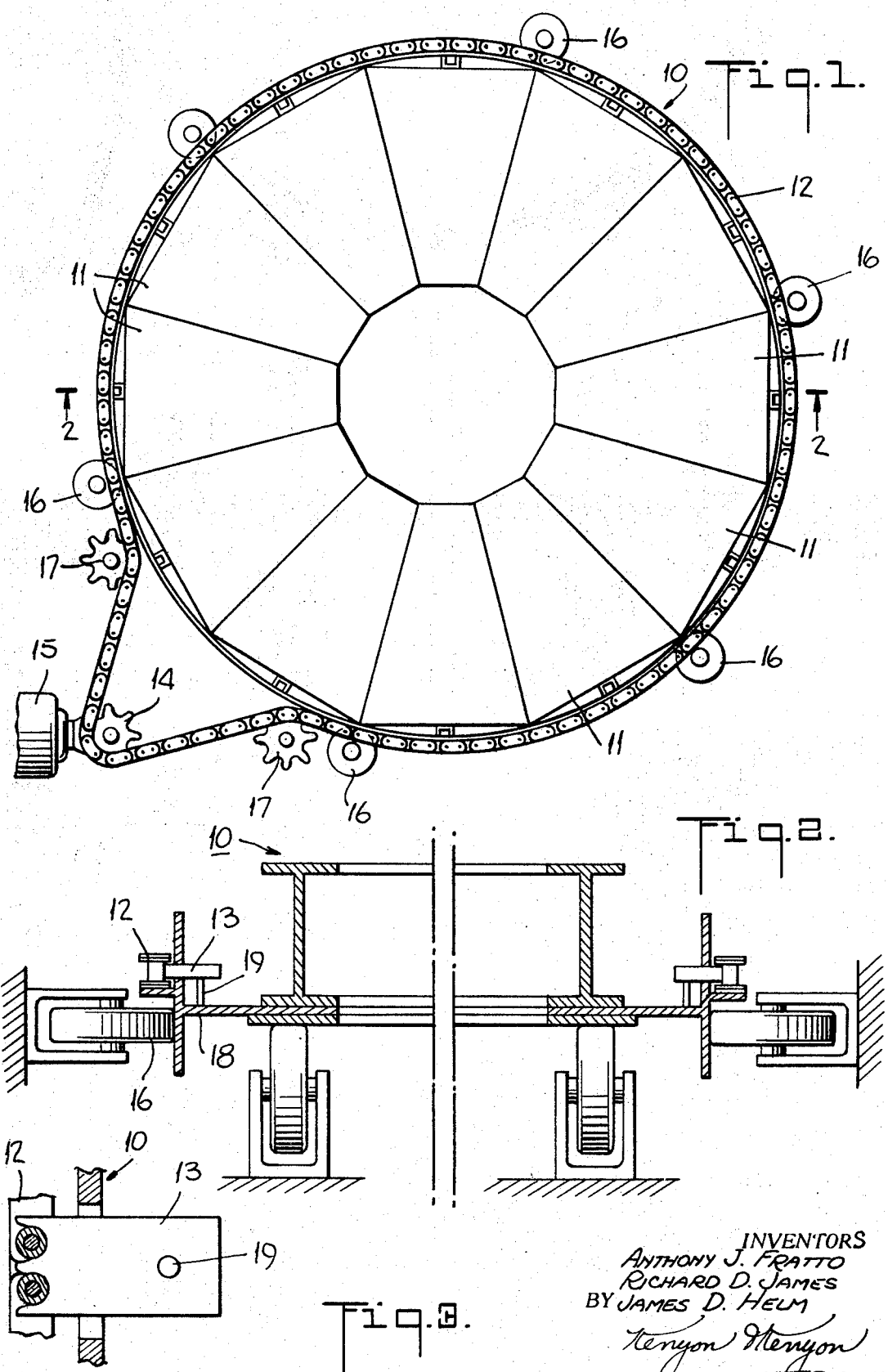

OUTSIDE DRIVE FOR A TILTING PAN FILTER

This invention relates to a drive for a tilting pan filter.

Tilting pan filters have been known wherein a rotary filter having a plurality of radially directed pans is rotated about a central axis. In some instances, in order to rotate the filters, a link chain is attached around the outside of the filter for meshing engagement with a plurality of independently mounted sprockets outside the filter which are driven through suitable electric motors. In addition, other pan filters are known wherein a rotary filter is driven through a small ring gear and drive pinion near the center. However, in these cases, it has been found that such drive arrangements require relatively large horsepower in order to drive the rotary filters. Furthermore, in the latter case, the torque from the drive mechanism is applied at a point spaced approximately 3 feet from the center line of the filter while relying upon the meshing of the respective gears together to transfer the torques. Further, these heretofore known drive mechanisms have been subjected to relatively great wear due to the large weights which have to be moved as well as to the attrition which develops between the meshing gears. Because of the location of the force which causes rotation in relation to the friction which resists the motion, the movement of the filter is jerky. Finally, these heretofore drive mechanisms have been relatively expensive due in part to the fact that such have to utilize custom made parts rather than standard parts which are readily obtainable.

Accordingly, it is an object of this invention to provide rotating pan filters with a simple inexpensive drive arrangement.

Another object of the invention is to provide a drive mechanism for a tilting pan filter of relatively small weight.

It is another object of the invention to provide a drive mechanism which can be easily and rapidly maintained.

Another object of the invention is to provide a drive for a rotary filter which imparts a smooth, nonhesitating rotational force to the filter.

It is another object of the invention to provide a drive mechanism which applies an increased torque to a rotary tilting pan filter.

Briefly, the invention provides a tilting pan filter, for example, a filter manufactured by the Byrd Machine Co., South Walpole, Mass., under the name of Prayon Tilting Pan Filter with an outside drive arrangement. The outside drive arrangement includes a continuous drive chain which engages with the periphery of the tilting pan filter by suitable teeth thereon, a driver sprocket positioned outside the tilting pan filter and a drive unit which is operatively connected to the driver sprocket to drive the driver sprocket so as to cause endless movement of the drive chain therethrough. In addition, a plurality of centering wheels are positioned about the pan filter in order to properly center the pan filter as well as the drive chain with respect to the pan filter. In addition, a pair of take up sprockets are mounted to either side of the driver sprocket so as to impart the proper degree of tension to the drive chain in passing around the driver sprocket and pan filter.

In operation, the drive mechanism applies a torque to the periphery of the rotary pan filter so that a relatively large torque can be applied at the furthest distance from the axis of the rotary filter. In the event that any wear or chain stretch should take place, the sprocket wheels and take up sprockets are suitably adjusted with respect to the chain drive so as to tighten up or increase the length of the pathway through which the chain passes so as to maintain a secure drive relationship with the rotary pan filter.

These and other objects and advantages of the invention will become more apparent from the following detailed description and appended claims taken in conjunction with the accompanying drawings in which:

FIG. 1 illustrates a plan view of a rotary filter body incorporating the drive mechanism according to the invention;

FIG. 2 illustrates a view taken on line 2-2 of FIG. 1; and

FIG. 3 illustrates a sectional view of the engagement of the drive chain with the teeth on the pan filter periphery.

Referring to FIGS. 1 and 2, the rotary pan filter 10, for example, a filter as manufactured by the Byrd Machine Co., South Walpole, Mass., under the name of Prayon Tilting Pan Filter, is constructed of a plurality of tiltable pans 11 and is encircled by a drive chain 12 which meshes with suitable teeth 13 secured to the periphery of the pan filter 10. In addition, the drive chain 12 meshes with a driver sprocket 14 mounted independently of the pan filter 10 and in spaced relation thereto. The driver sprocket 14 is operatively connected to a drive unit 15 such as an electric motor in a known manner so as to be driven thereby. The driver sprocket 14 meshes with the drive chain 12 so as to drive the drive chain 12 in an endless path and thereby rotate the pan filter 10 about its central vertical axis.

In addition, a plurality of centering wheels 16 are positioned about the rotary pan filter 10 to maintain a constant, centered position of the rotary pan filter 10. Also, a pair of take up sprockets 17 are mounted to the stationary supports of the pan filter 10 adjacent to the driver sprocket 14. These sprockets 17 are adjustably mounted horizontally with respect to the driver sprocket 14 so as to take up any slack in the drive chain 12 so that the drive chain tightly meshes with the rotary pan filter 10. The take up sprockets 17 engage the drive chain 12 in a manner so as to shorten or lengthen the endless path of the drive chain 12 around the pan filter 10 and driver sprocket 14.

Referring to FIGS. 2 and 3, all of the teeth 13 can be fixed, as by welding, to the pan filter at least some of the teeth are mounted on the frame 18 of the pan filter 10 in a hinged manner in order to allow for automatic self-adjustment to compensate for chain wear and pitch changes. To this end, for example, six teeth segments 13 of double tooth structure are equi-spaced about the periphery of the pan filter 10 and pivotally mounted on a hinge pin 19 fixed to the frame 18.

The invention thus provides a rotary pan filter with a drive mechanism which imparts a relatively large torque in a simple manner. Additionally, this relatively large torque is accomplished with a relative minimum of horsepower since the application of the torque to the pan filter takes place at a maximum point from the center of the rotary pan filter 10 on the outer surface of the filter 10. The various drive components utilized in the drive mechanism consists of a standard drive chain and a standard sprocket such that the initial cost is relatively low. Furthermore, since a chain and sprocket drive is utilized a smooth nonhesitating rotational force is imparted to the machine which prevents excessive wear on the bearings and other rotating components of the rotary pan filter. Accordingly, only nominal maintenance is required to use the rotary pan filter. This also results in greater availability of the filter for use. Finally, the use of a drive chain with meshing teeth on the rotary pan filter results in relatively less attrition than would otherwise occur with meshing gears.

The invention thus provides a drive for a rotary pan filter which is of relatively low cost and which requires minor, if any, structural modifications of the rotary pan filter.

We claim:

1. In combination with a rotary pan filter, a drive mechanism comprising a drive chain encircling and engaging said rotary pan filter, a driver sprocket spaced from said rotary pan filter and driveably engaging said drive chain, and motor means operatively connected to said driver sprocket to rotate said sprocket to drive said drive chain.

2. The combination as set forth in claim 1 which further includes a pair of spring-loaded take up sprockets spaced on opposite sides of said driver sprocket from said drive chain and engaging with said chain.

3. The combination as set forth in claim 2 wherein said spring-loaded take up sprockets are adjustably mounted with respect to said driver sprocket to vary the path of said drive chain.

4. The combination as set forth in claim 1 which further comprises a plurality of centering wheels spaced about said rotary pan filter for centering said drive chain against said rotary pan filter.

5. The combination as set forth in claim 1 which further comprises a plurality of teeth mounted on the periphery of said pan filter, said teeth being in meshing engagement with said drive chain for rotation of said pan filter.

6. The combination as set forth in claim 5 wherein at least some of said teeth are pivotally mounted on said pan filter to adjust to changes in chain wear.